US009320181B1

(12) United States Patent
Schleif et al.

(10) Patent No.: US 9,320,181 B1
(45) Date of Patent: Apr. 19, 2016

(54) SYSTEM AND METHOD FOR DISSIPATING THERMAL ENERGY AWAY FROM ELECTRONIC COMPONENTS IN A ROTATABLE SHAFT

(71) Applicant: General Electric Company, Schenectady, NY (US)

(72) Inventors: Kurt Kramer Schleif, Greenville, SC (US); Donald W. Shaw, Simpsonville, SC (US); Zachary John Snider, Simpsonville, SC (US); Mario Joseph Arceneaux, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 13 days.

(21) Appl. No.: 14/541,203

(22) Filed: Nov. 14, 2014

(51) Int. Cl.
*H05K 7/20* (2006.01)
*H05K 7/14* (2006.01)

(52) U.S. Cl.
CPC .............. *H05K 7/209* (2013.01); *H05K 7/1432* (2013.01)

(58) Field of Classification Search
CPC ............ H05K 7/2039; H05K 7/20409; H05K 7/20418; H05K 7/20445; H05K 7/205; H05K 5/0004; H05K 5/0021; H05K 5/0026; H05K 7/1432; F01D 25/28; F01D 21/003; F03D 7/042; F05D 2220/31; F05D 2220/32; F05D 2240/60; F05D 2240/80
USPC .................. 361/709–711, 715–716, 719, 721, 361/736–759; 165/80.2; 257/712; 174/547–548
See application file for complete search history.

(56) References Cited

U.S. PATENT DOCUMENTS

| 4,520,428 | A | * | 5/1985 | Lusk | .................... H05K 7/1417 211/41.17 |
|---|---|---|---|---|---|
| 4,953,058 | A | * | 8/1990 | Harris | ................ H05K 7/20545 165/80.3 |
| 5,343,361 | A | * | 8/1994 | Rudy, Jr. | ............... H05K 7/1412 174/354 |
| 6,587,339 | B1 | * | 7/2003 | Daniels | .............. H05K 7/20445 361/690 |
| 6,781,830 | B2 | * | 8/2004 | Barth | ................. H05K 7/20445 165/185 |
| 8,527,241 | B2 | * | 9/2013 | Mitchell | ................. F01D 17/02 340/870.01 |
| 8,913,390 | B2 | * | 12/2014 | Malek | .................... H05K 7/205 165/104.33 |
| 9,071,888 | B2 | * | 6/2015 | Subramanian | ............ F01D 5/12 |
| 2010/0039779 | A1 | * | 2/2010 | Mitchell | ................ H05K 1/092 361/739 |
| 2013/0342360 | A1 | * | 12/2013 | Bevly, III | ............. H04B 5/0075 340/870.07 |

OTHER PUBLICATIONS

Co pending U.S. Appl. No. 14/541,196 dated Nov. 14, 2014.

* cited by examiner

*Primary Examiner* — Zachary M Pape
(74) *Attorney, Agent, or Firm* — Dority & Manning, PA

(57) ABSTRACT

A system for dissipating thermal energy from electronic components disposed within a rotatable shaft includes an annular carrier shaft having one end formed to couple to an end of a rotor shaft. The system also includes a transmitter assembly. The transmitter includes an outer casing, a daughter board and a circuit board electronically coupled to the daughter board within an inner pocket of the transmitter housing. The circuit board comprises a strip of thermally conductive material. The transmitter assembly further includes a lid that at least partially seals the inner pocket. A contact surface of the lid is in thermal communication with the thermally conductive material of the circuit board and at least a portion of a top surface of the lid is thermally coupled to an inner surface of the carrier shaft during rotation thereof. A method for dissipating thermal energy away from the circuit board is also provided.

20 Claims, 8 Drawing Sheets

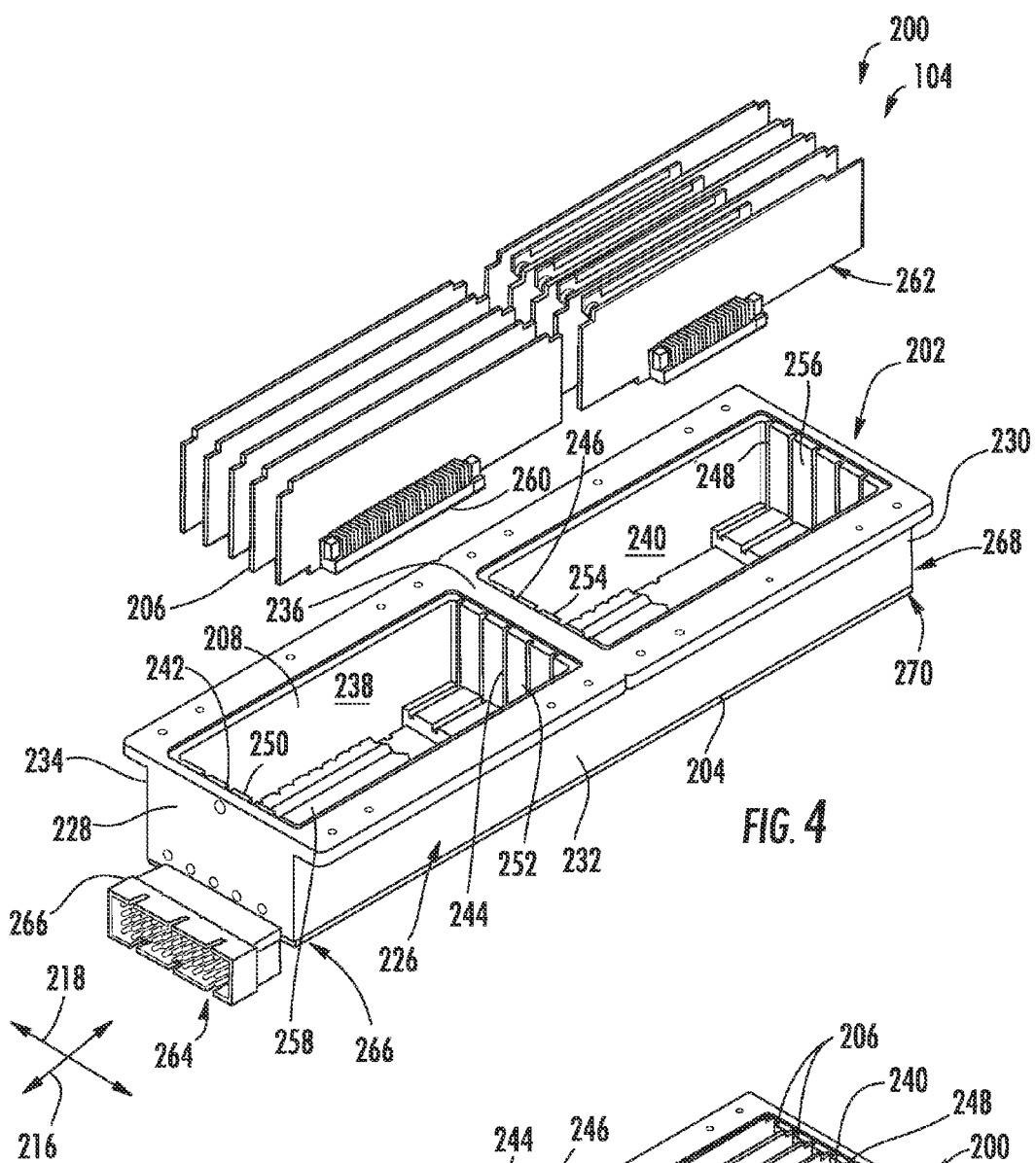
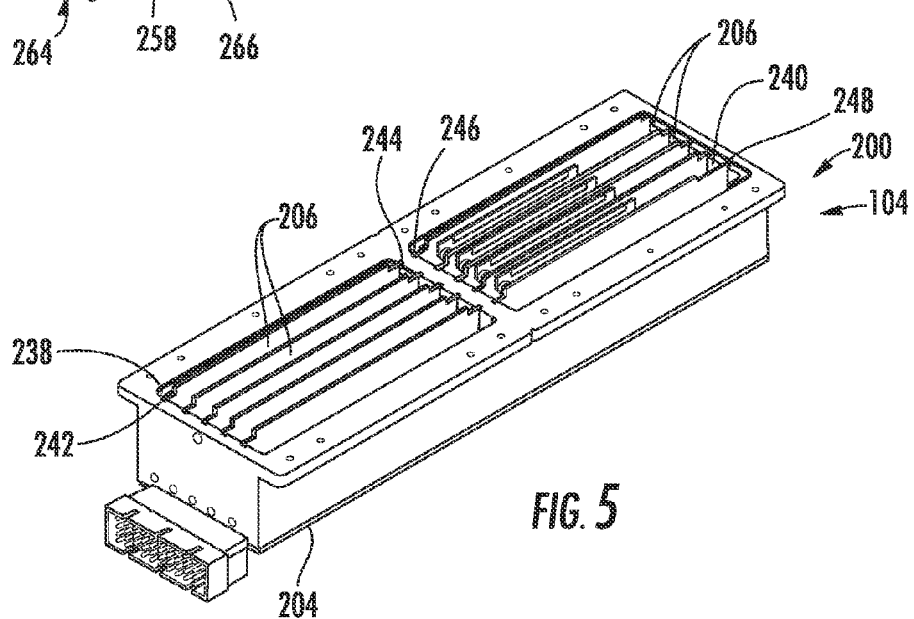

SYSTEM AND METHOD FOR DISSIPATING THERMAL ENERGY AWAY FROM ELECTRONIC COMPONENTS IN A ROTATABLE SHAFT

FIELD OF THE INVENTION

The present invention generally involves a slip ring assembly for a turbomachine. More specifically, the present invention involves a system and method for dissipating thermal energy away from electronic components packaged in a rotatable shaft.

BACKGROUND OF THE INVENTION

Turbomachines such as wind turbines, gas turbines, steam turbines, pumps, fans, generators, motors, and other forms of commercial equipment frequently include shafts, blades, and other rotating components. It is known in the art to install one or more sensors on the rotating components to measure various characteristics of those components in order to control, monitor, and/or enhance the operation of the rotating components. For example, sensors that measure temperature, velocity, stress, strain, vibrations, and/or other characteristics of the rotating components may allow for early detection of abnormalities, adjustments to repair or maintenance schedules, and/or other actions to enhance operations.

Various slip ring and telemetry systems are known in the art for transmitting the analogue sensor data from the rotating components to stator components for further analysis. Analogue and digital signals from the sensors are routed via wires to individual slip or contact rings positioned axially along a rotatable center bore or shaft portion of the slip ring assembly. Stationary contact arms or brushes then provide a signal path for routing the signals from the rotating contact or slip rings to a controller, data processor or the like.

In order to accommodate ever-increasing data requirements for test and operation of the turbomachine, it is necessary to digitize and compress at least some of the analogue signals from the sensors prior to passing the signals on to the slip or contact rings. This requires various electronic components such as circuit boards to be mounted such as in carrier shaft that is coupled at one end to the rotor shaft of the turbomachine. During operation, the various electronic components generate a considerable amount of heat that must be dissipated to avoid thermal fatigue thereto. However, the electronics may be sealed within the carrier shaft. Therefore, a system and method for dissipating the thermal energy away from the electronic components disposed therein would be useful.

BRIEF DESCRIPTION OF THE INVENTION

Aspects and advantages of the invention are set forth below in the following description, may be obvious from the description, or may be learned through practice of the invention.

One embodiment of the present invention is a system for dissipating thermal energy from electronic component disposed within a rotatable shaft. The system includes an annular carrier shaft having an inner surface radially spaced from an outer surface and one end formed to couple to an end of a rotor shaft. A transmitter assembly is radially supported within the carrier shaft. The transmitter assembly includes a transmitter housing that defines an inner pocket therein. A daughter board extends laterally and longitudinally across a bottom portion of the transmitter housing. A circuit board is electronically coupled to the daughter board and extends substantially perpendicular to the daughter board within the inner pocket. A strip of thermally conductive material is disposed along a top portion of the circuit board. A is lid connected to a top portion of the transmitter housing and at least partially seals the inner pocket. A contact surface of the lid is in thermal communication with the thermally conductive material of the circuit board. At least a portion of a top surface of the lid is in thermal communication with the inner surface of the carrier shaft during rotation thereof.

Another embodiment of the present invention is a turbomachine. The turbomachine includes an annular rotor shaft, a plurality of sensor wire bundles extending outwardly from an inner passage of the rotor shaft, an annular carrier shaft formed to couple at a first end to an end portion of the rotor shaft. The carrier shaft includes a second end that is axially spaced from the first end and an inner surface that is radially spaced from an outer surface. The turbomachine also includes a plurality of transmitter assemblies circumferentially spaced within the carrier shaft. Each transmitter assembly comprises a transmitter housing that defines an inner pocket therein. A daughter board extends laterally and longitudinally across a bottom portion of the transmitter housing and is electronically coupled at one end to one wire bundle of the plurality of wire bundles. A circuit board is electronically coupled to the daughter board. The circuit board extends substantially perpendicular to the daughter board within the inner pocket and comprises a strip of thermally conductive material disposed along a top portion of the circuit board. The transmitter assembly further includes a lid connected to a top portion of the transmitter housing that at least partially seals the inner pocket. A contact surface of the lid is in thermal communication with the thermally conductive material of the circuit board. At least a portion of a top surface of the lid is in thermal communication with the inner surface of the carrier shaft during rotation thereof.

Embodiments of the present invention may also include a method for dissipating thermal energy from electronic components disposed within a rotatable shaft. The method includes thermally coupling an outer surface of a lid of a transmitter assembly against an inner surface of an annular carrier shaft via centrifugal forces by rotating the carrier shaft where the lid is connected to a top portion of a transmitter housing of the transmitter assembly and at least partially seals an inner pocket formed within the transmitter housing. The method also includes passing a current through at least one electrical component disposed on a circuit board mounted within the inner pocket where the component generates thermal energy as the current flows therethrough and where the circuit board comprises a strip of thermally conductive material that is disposed along a top portion of the circuit board. The strip of thermally conductive material is thermally coupled to the electronic component. The method also includes conductively transferring at least a portion of the thermal energy generated by the electronic component from the circuit board to the lid via the strip of thermally conductive material and a contact surface of the lid and conductively transferring the thermal energy from the lid to the carrier shaft.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in that:

FIG. 4 is an exploded perspective view of a portion of the transmitter assembly as shown in FIG. 3, according to at least one embodiment of the present invention;

FIG. 5 is a perspective view of the transmitter assembly as shown in FIG. 4, according to at least one embodiment;

DETAILED DESCRIPTION OF THE INVENTION

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Although exemplary embodiments of the present invention are described generally in the context of a gas turbine for purposes of illustration, one of ordinary skill in the art will readily appreciate that embodiments of the present invention may be applied to any turbomachine. For example, the present invention may be applied to a steam turbine, a wind turbine, a fan or the like that includes electronics such as analog to digital convertors connected to a rotating shaft and the specification is not intended to be limited to a gas turbine turbomachine unless otherwise specified in the claims.

Figure 1:
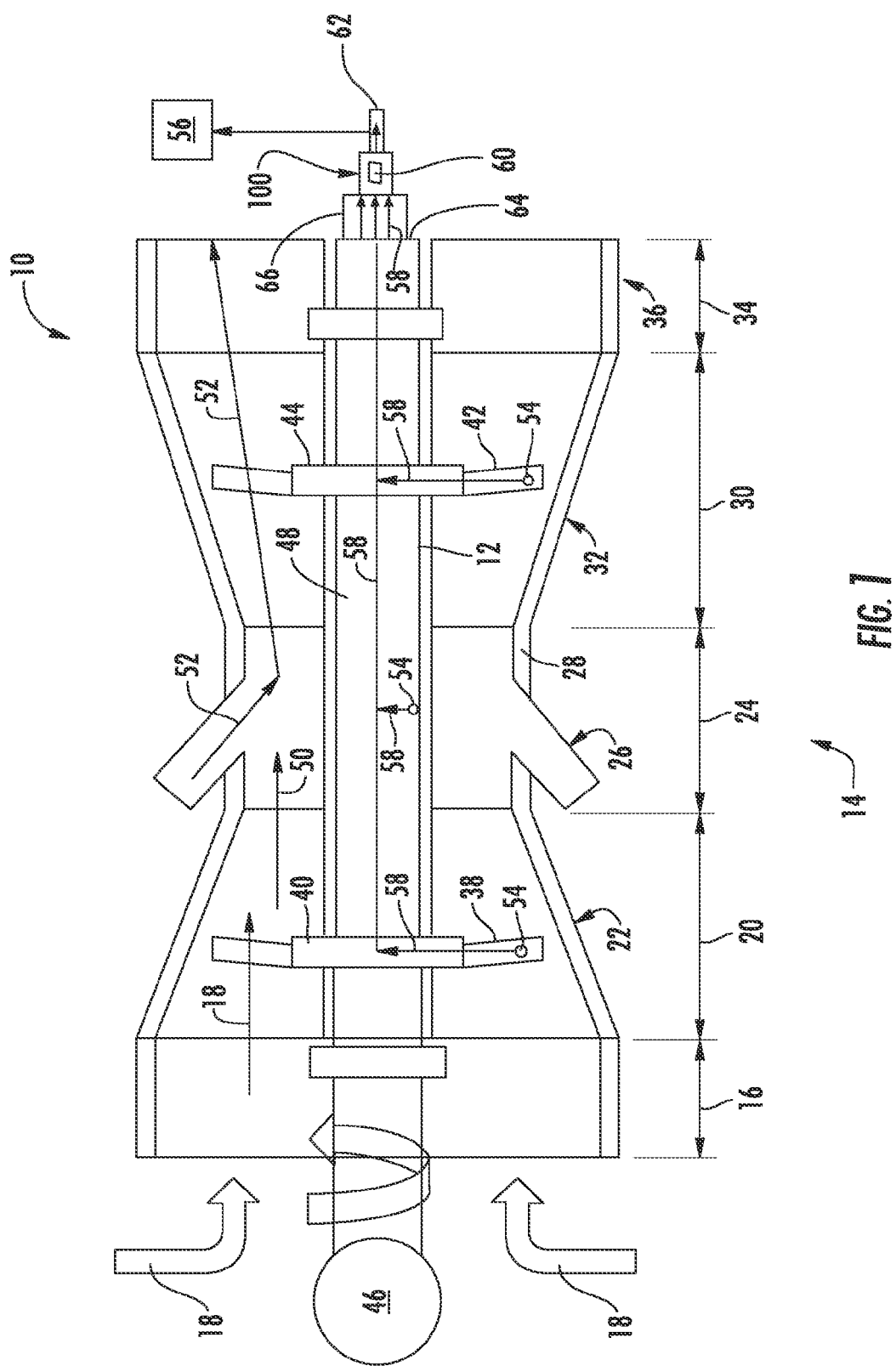
FIG. 1 is a functional block diagram of an exemplary turbomachine having a rotor shaft that extends along an axial centerline of the turbomachine as may be incorporated into various embodiments of the present invention.

Referring now to the drawings, wherein identical numerals indicate the same elements throughout the figures, FIG. 1 provides a functional block diagram of an exemplary turbomachine 10 having a rotor shaft 12 that extends along an axial centerline of the turbomachine 10. In particular embodiments, as shown in FIG. 1 the turbomachine 10 is a gas turbine 14. The gas turbine 14 generally includes an inlet section 16 that may include a series of filters, cooling coils, moisture separators, and/or other devices (not shown) to purify and otherwise condition air 18 entering the gas turbine 14. A compressor section 20 including a compressor 22 is disposed downstream from the inlet section 16. A combustion section 24 is disposed downstream from the compressor section 20 and may include a plurality of combustors 26 annularly arranged around an outer casing 28 such as a compressor discharge casing.

A turbine section 30 including a high and/or low-pressure turbine 32 is disposed downstream from the combustion section 24. The gas turbine 14 may also include an exhaust section 34 that includes an exhaust duct or diffuser 36 that is disposed downstream from an outlet of the turbine 32. In particular embodiments, the inlet section 16, compressor 22, the combustion section 24, turbine 32 and the exhaust duct 36 define a primary flow passage through the gas turbine 12.

The compressor 20 generally includes multiple rows or stages of compressor blades 38 (only one stage shown) where each row of compressor blades 38 is coupled to the rotor shaft 12 via a compressor rotor disk 40. In addition, the turbine 32 generally includes multiple rows or stages of turbine blades 42 (only one stage shown) where each row of the turbine blades 42 may be coupled to the rotor shaft 12 via a turbine rotor disk 44. The compressor and turbine blades 38, 42 are generally mounted, angled and/or formed such that rotation of the rotor shaft 12 causes the air 18 to be drawn through the inlet section 16 and into the compressor 22.

In particular embodiments, the rotor shaft 12 may be connected to a motor and/or a generator 46 in order to turn the rotor shaft 12 and/or to generate electrical power and/or mechanical work. The rotor shaft 12 may be a single shaft or may include multiple shafts coupled to form a singular shaft through the turbomachine 10 or gas turbine 14. In particular embodiments, the rotor shaft 12 is annularly shaped to form or define an inner passage 48 that extends axially therein.

In operation, air 18 is drawn through the inlet section 16 and into the compressor 22 where it is progressively compressed to provide compressed air 50 to the combustion section 24. The compressed air 50 is routed to the combustors 26 where it is mixed with a fuel. The fuel-air mixture in each combustor 26 is burned, thus generating high temperature combustion gases 52 at a high velocity. The combustion gas 52 is routed through the turbine 32 where thermal and kinetic energy are transferred from the combustion gases 52 to the turbine blades 42, thus causing the rotor shaft 12 to rotate. The combustion gas 52 is exhausted through the exhaust duct 36.

During operation of a turbomachine 10 such as the gas turbine 14 described herein, the various rotatable components such as the compressor blades 38, the compressor rotor disks 40, the turbine blades 42, the turbine rotor disks 44, the rotor shaft 12 and various other rotatable turbomachine components are exposed to potentially life limiting thermal and/or mechanical stresses. As a result, it is generally desirable to monitor various operating parameters such as temperature, velocity, stress, strain, vibrations, and/or other characteristics of the rotating components that may allow for early detection of abnormalities, allow for adjustments to repair or maintenance schedules, and/or other actions to enhance operation and/or efficiency of the turbomachine 10.

In order to monitor the various operating parameters at the various rotatable components, sensors 54 may be coupled to or disposed proximate to the various rotatable components within the turbomachine 10. The sensors 54 may comprise pressure detectors, strain gauges, or accelerometers that generate one or more signals reflective of vibrations or movement by the compressor blades 38, turbine blades 42, or other rotating components. In other embodiments, the sensors 54 may comprise thermocouples or resistance temperature detectors that generate one or more signals reflective of the temperature of the various rotating components. One of ordinary skill in the art will readily appreciate that embodiments of the present invention are not limited to any particular sensor unless specifically recited in the claims.

The sensors 54 may be placed on the compressor blades 38, compressor rotor disks 40, turbine blades 42, and turbine rotor disks 44, within the inner passage 48 of the rotor shaft 12 or on any rotatable component of the turbomachine. Signals are transmitted from the rotatable sensors 54 to a stationary data processor 56 such as a controller or computing device via wires 58 and a slip ring assembly. In particular embodiments, at least some of the sensors 54 are electronically coupled to various electronics 60 that may process, modify or otherwise manipulate the signals from the sensors 54. For example, the electronics 60 may include analog to digital convertors or the like to digitize the signals upstream from a slip ring 62 and/or the stationary data processor 56. Therefore, in many cases it is necessary to mount the electronics 60 to and/or within the rotor shaft 12, thus subjecting the electronics 60 to potentially life limiting g-loads and/or thermal stresses.

Figure 2:
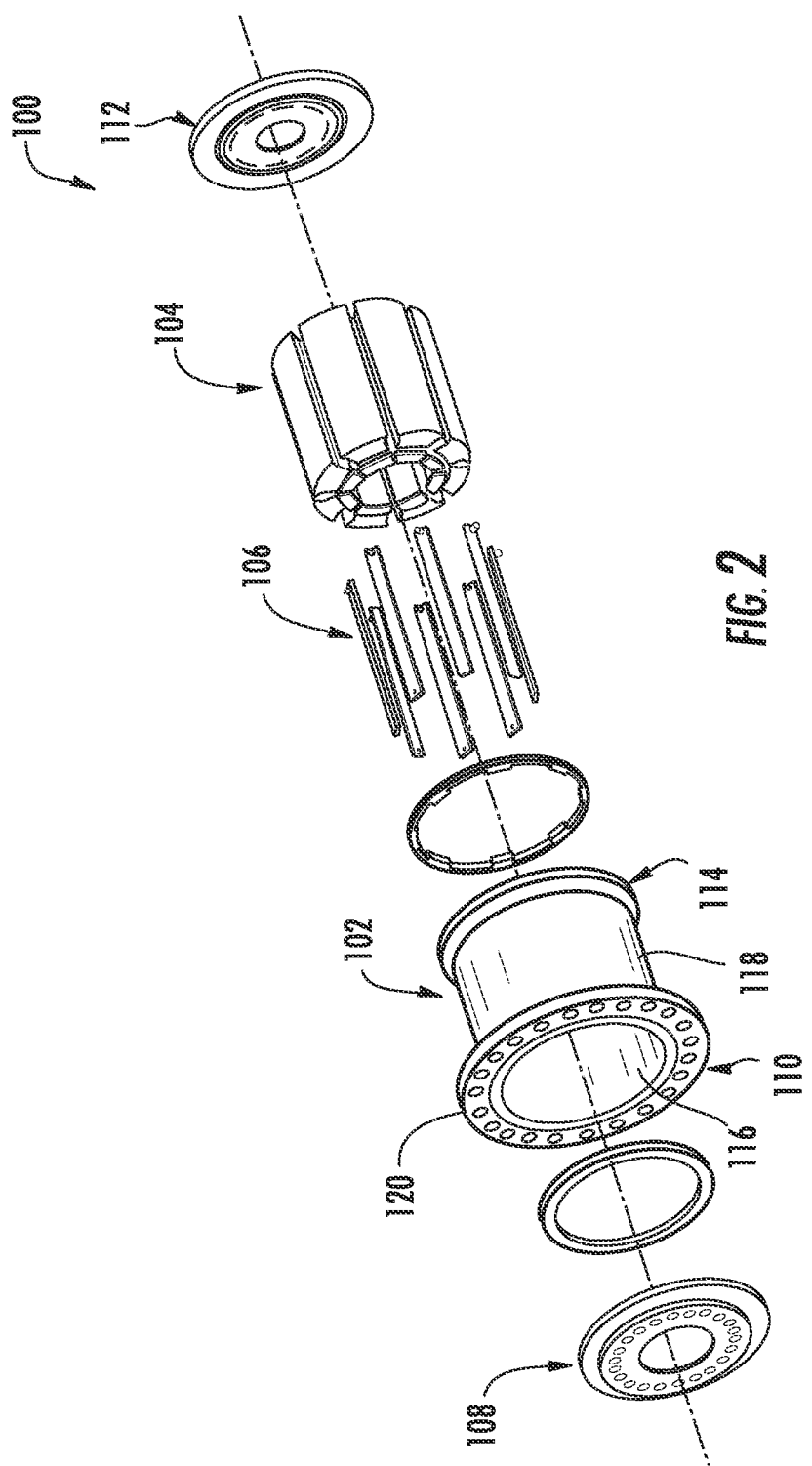
FIG. 2 is an exploded perspective view of a system for dissipating thermal energy away from electronic components mounted within a rotatable shaft according to various embodiments of the present invention.

FIG. 2 provides an exploded perspective view of a system for dissipating thermal energy away from electronic components mounted within a rotatable shaft 100, herein referred to as "system", according to various embodiments of the present invention. As shown in FIG. 1, the system 100 may be coupled to one end 64 of the rotor shaft 12. In particular embodiments, the system 100 may be coupled to the rotor shaft 12 via an extension shaft 66. The extension shaft 66 may provide a means for routing wires 58 from the rotor shaft 12 to the system 100 and/or for electronically coupling the wires 58 to the system 100, for example, via a plurality of connectors (not shown) coupled to terminating ends of the wires 58.

In one embodiment, as shown in FIG. 2, the system 100 includes an annular carrier shaft 102 and at least one transmitter assembly 104. In one embodiment, the system 100 includes a plurality of the transmitter assemblies 104 annularly arranged about an axial centerline of the carrier shaft 102. In particular embodiments, the system 100 may include a plurality of rail members 106, a forward motherboard 108 that is disposed at and/or extends radially and circumferentially across a forward end 110 of the carrier shaft 102 and an aft motherboard 112 that is disposed at and/or extends radially and circumferentially across an aft end 114 of the carrier shaft 102.

The carrier shaft 102 includes an inner surface or side 116 and an outer surface or side 118 that is radially separated from the inner surface 116. The carrier shaft 102 is at least partially formed from a thermally conductive material. For example, the carrier shaft 102 may be formed from aluminum, metal, metal alloys or other thermally conductive materials. The forward end portion 110 of the carrier shaft 102 may be formed to couple with the end 64 of the rotor shaft 12 (FIG. 1). For example, as shown in FIG. 2, the forward end 110 of the carrier shaft 102 may include a radially extending flange 120.

Figure 3:
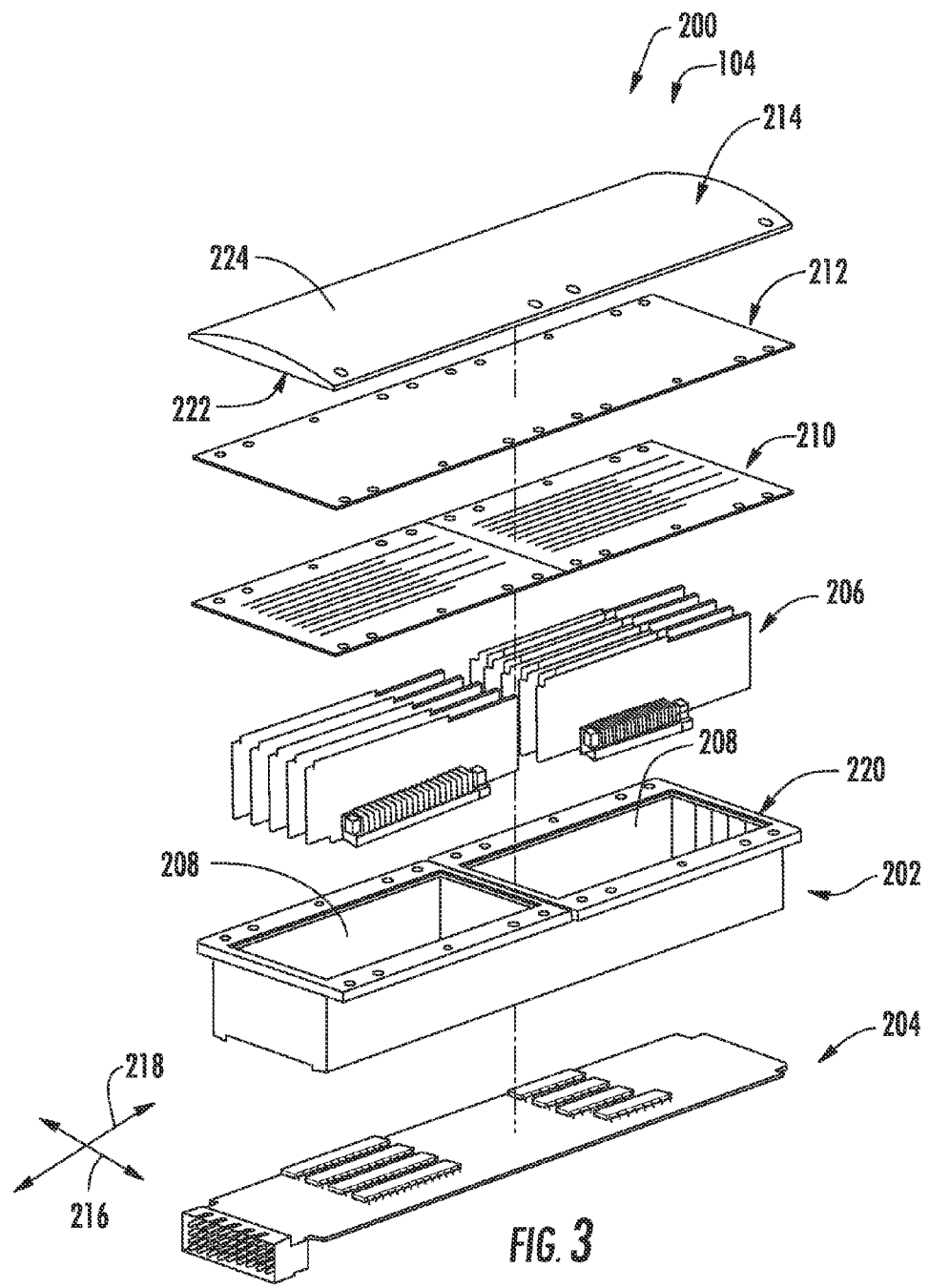
FIG. 3 is an exploded perspective view of an exemplary transmitter assembly according to various embodiments of the present invention.

FIG. 3 provides an exploded perspective view of an exemplary transmitter assembly 200 that is representative of at least one transmitter assembly 104 of the plurality of transmitter assemblies 104 according to various embodiments of the present invention. In particular embodiments, as shown in FIG. 3, the transmitter assembly 200 includes a transmitter housing 202, a primary circuit or daughter board 204 and at least one circuit board 206. In various embodiments, the circuit board 206 is vertically mounted within an inner pocket 208 formed within the transmitter housing 202. In particular embodiments, the transmitter assembly 200 comprises a plurality of circuit boards 206 vertically mounted within the inner pocket 208.

In one embodiment, the transmitter assembly 200 includes a partitioning plate 210. In addition or in the alternative, the transmitter assembly 200 may include a shim 212. In particular embodiments the shim 212 is at least partially formed from a thermally conductive material such as copper, aluminum or other thermally conductive material. In particular embodiments, at least a portion of the partitioning plate 210 may be formed from a thermally conductive material such as copper, aluminum or other thermally conductive material.

In various embodiments, the transmitter assembly 200 includes a lid 214. The lid 214 is formed to extend laterally or in a lateral direction 216 and longitudinally or in a longitudinal direction 218 across a top portion 220 of the transmitter housing 202. In one embodiment, the lid 214 at least partially seals the circuit boards 206 within the inner pocket 208. The lid 214 includes an inner or contact surface 222 that is radially separated from an outer or top surface 224. In various embodiments, at least a portion of the outer surface 224 is arcuate. In particular embodiments, the outer surface 224 of the lid has a radius that is the same or substantially the same as a radius of the carrier shaft 102 inner surface 116. In particular embodiments, at least a portion of the lid 214 is formed from a thermally conductive material such as copper, aluminum or other thermally conductive material, thus allowing for conductive heat transfer between the contact surface 222 and the outer surface 224.

FIG. 4 provides an exploded perspective view of a portion of the transmitter assembly 200 as shown in FIG. 3, according to at least one embodiment of the present invention. As shown in FIG. 4, the daughter board 204 extends laterally 216 and longitudinally 218 across a bottom portion 226 of the transmitter housing 202. The daughter board 204 may be fixedly connected to the transmitter housing 202 via mechanical fasteners (not shown), epoxy, solder or by any means suitable for fixedly connecting the daughter board 204 to the transmitter housing 202.

In various embodiments, as shown in FIG. 4, the transmitter housing 202 includes a forward wall 228, an aft wall 230 and a pair of laterally opposing sidewalls 232, 234 that at least partially form the inner pocket 208 therein. In particular embodiments, the transmitter housing 202 may include an intermediate wall 236 that extends laterally between the opposing sidewalls 232, 234 within inner pocket 208. The intermediate wall 236 may at least partially define a first inner pocket 238 and a second inner pocket 242 within the transmitter housing 202. For example, the forward, intermediate and side walls 228, 236, 232, 234 may define the first inner pocket 238 and the intermediate, aft and side walls 236, 230, 233, 234 may define the second inner pocket 240 within the transmitter housing 202.

In particular embodiments, vertically oriented slots 242, 244, 246, 248 that are generally perpendicular to the daughter board 204 are defined along at least some or all of inner surfaces 250, 252, 254, 256 of at least one of the forward wall 228, the intermediate wall 236 and/or the aft wall 230. In particular embodiments, the daughter board 204 at least partially seals the inner pocket 208. In one embodiment, the daughter board 204 at least partially seals the first and second inner pockets 240, 242.

In various embodiments, the circuit board 206 is electrically coupled to the daughter board 204 within the transmitter housing 202, particularly within the inner pocket 208 or first and second inner pockets 238, 240. For example, as shown in FIG. 4, the circuit board 206 may be electronically coupled via one or more connectors 258 that are coupled to the daughter board 204. In one embodiment, at least some of the circuit boards 206 are electronically coupled to the daughter board 204 via connectors 260 that are disposed along a bottom portion 262 of each corresponding circuit board 206.

In particular embodiments, a forward or first connector 264 is electronically coupled to the daughter board 204 proximate to a forward end portion 266 of the daughter board 204. In particular embodiments, a second or aft connector 268 is electronically coupled to the daughter board 204 proximate to an aft end portion 270 of the daughter board 204. In particular embodiments, the first and second connectors 264, 268 are electronically coupled to each other via one or more of the circuit boards 206 and/or one or more circuits (not shown) disposed on the daughter board 204.

In particular embodiments, the circuit board 206 may be configured to receive, process and transmit the various signals provided by the sensors 54 or other components that are coupled to the rotor shaft 12. For example, the circuit board 206 may include various circuits, electronic components and or processors that are configured and/or programmed to receive analog signals from the sensors 54 via the wires 58, the forward motherboard 108 and the first or forward connector 262, digitize and or compress the and/or otherwise process the signals and transmit the processed signals to the slip ring 62 via the second or aft connector 268.

FIG. 5 provides a perspective view of the transmitter assembly 200 as shown in FIG. 4, according to at least one embodiment. In one embodiment, as shown in FIG. 5, the plurality of circuit boards 206 is divided between the first and second inner pockets 238, 240. In various embodiments, as shown in FIG. 5, at least some of the circuit boards 206 of the plurality of circuit boards 206 are supported vertically via the slots 242, 244 or 246, 248. In this manner, the slots 242, 244 or 246, 248 may restrict or reduce tangential g-loads on the circuit boards 206 during rotation of the rotor shaft 12 and/or the carrier shaft 102, thus maintaining the connection integrity between the circuit boards 206 and the daughter board 204.

Figure 6:
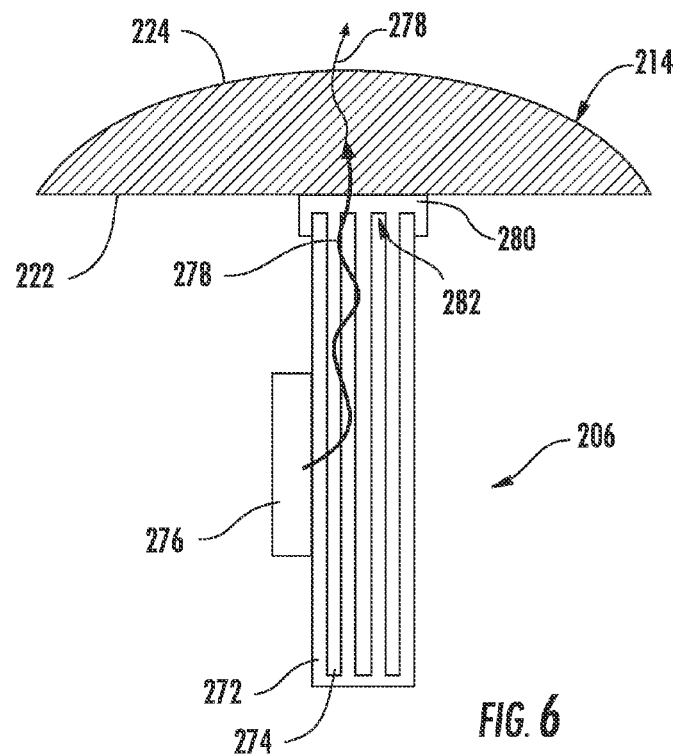
FIG. 6 is an enlarged cross sectional view of an exemplary circuit board as shown in FIG. 5, according to various embodiments of the present invention.

FIG. 6 provides an enlarged cross sectional view of an exemplary one of the circuit boards 206 as shown in FIG. 5 and a portion of the lid 214, according to various embodiments. As shown in FIG. 6, the circuit board 206 may be a commonly known multi-layer or printed circuit board (PCB). For example, the layers may alternate between a polyimide or insulating layer 272 and a copper trace or conductive layer 274.

In operation, at least one electronic component 276 such as integrated circuit (IC) chip, resistor, capacitor or the like may generate heat or thermal energy 278 as current flows through the electronic component 276. Typically, the thermal energy 278 is dissipated via air (convective cooling) or other cooling media. However, this method of cooling is not available for cooling the electronic component 276 or components sealed within the inner pocket 208, 238, 240 of the transmitter assembly 200.

In particular embodiments, as shown in FIG. 6, the circuit board 206 includes a strip of a thermally conductive material 280 or "strip 280", that is disposed or deposited along at least a portion of a top portion 282 of the circuit board 206 or circuit boards 206. The strip 280 may comprise a copper, aluminum or any other thermally conductive material that is suitable for the operating environment described herein. In particular embodiments, the strip 280 is in thermal communication with the electronic component 276 via at least one of the conductive layers 274. In one embodiment, the strip 280 is in contact and/or thermal communication with the contact surface 222 of the lid 214. In this manner, a thermal conduction path is defined therebetween.

Figure 7:
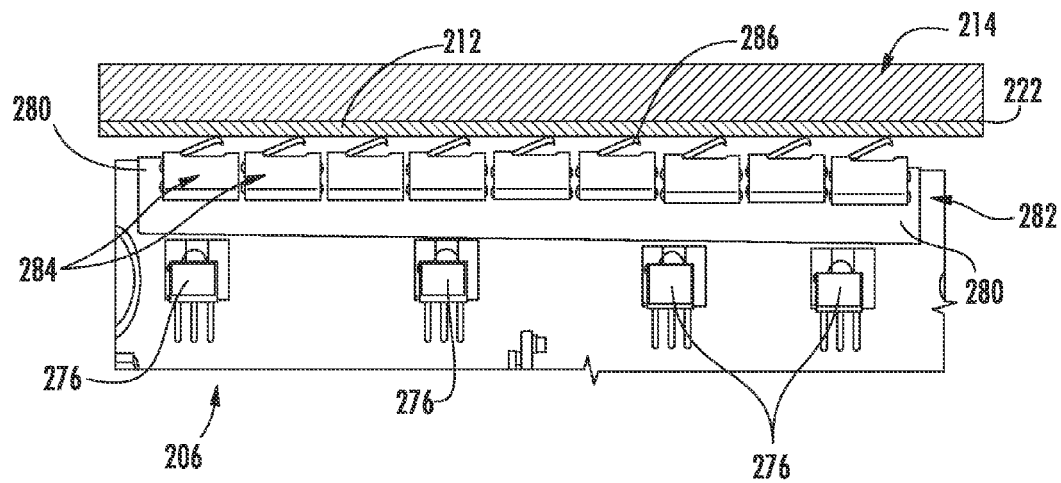
FIG. 7 is a side view of a top portion of an exemplary circuit board including a strip of thermally conductive material, according to one embodiment of the present invention.

FIG. 7 provides a side view of a top portion 282 of a circuit board 206 including the strip of thermally conductive material 280, according to one embodiment of the present invention. As shown in FIG. 7, at least one contact member 284 may be coupled to the top portion 282 of the circuit board 206. The contact member 284 is thermally coupled to the strip 280 and/or the electronic component 276. For example, the contact member 284 may be soldered or otherwise fixed to the circuit board 206. When installed into the transmitter housing 202, the contact member 284 is in thermal communication with the contact surface 222 of the lid 214. In one embodiment, the contact member 284 may be in thermal communication with the contact surface 222 of the lid 214 via the shim 212.

In one embodiment, the contact member 284 may include a spring or compression member 286. The compression member 286 extends radially from the top portion 282 of the circuit board 206 towards the inner or contact surface 222 of the lid 214 and/or the shim 212. During operation and/or when installed into the transmitter housing 202, the compression member 286 compresses against the inner or contact surface 222 and/or against the shim 212, thus defining a thermal conduction path between the strip of thermally conductive material 280 of the circuit board 206 and the contact surface 222 of the lid 214.

Figure 8:
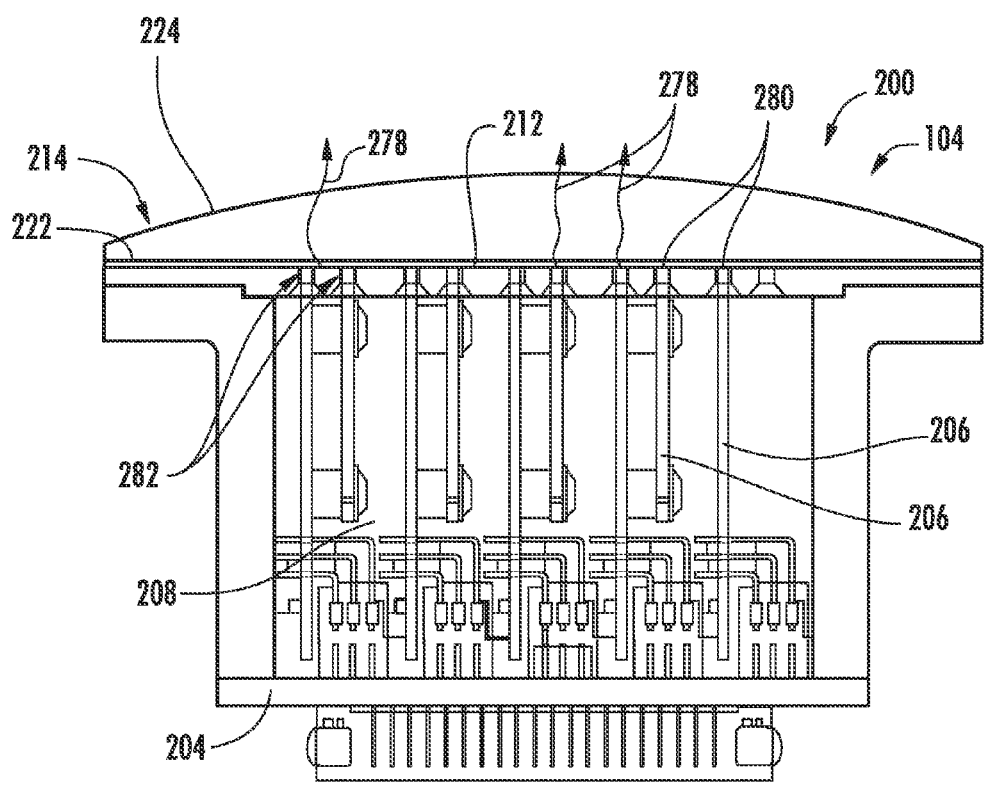
FIG. 8 is a cross sectional front view of an exemplary transmitter assembly in an assembled state, according to one or more embodiments of the present invention.

FIG. 8 provides a cross sectional front view of the transmitter assembly 200 in an assembled state, according to one or more embodiments of the present invention. In particular embodiments, as shown in FIG. 8, the circuit boards 206 extend substantially perpendicular to the daughter board 204 towards the inner or contact surface 222 of the lid 214. As shown in FIG. 8, the top portion 282 of at least some of the circuit boards 206 engage against or is in contact with the inner or contact surface 222 of the lid 214. As a result, the lid 214 may restrict radial movement and/or reduce radial g-loads on the circuit boards 206 during rotation of the rotor shaft 12 and/or the carrier shaft 102, thus maintaining the connection integrity between the circuit boards 206 and the daughter board 204. In addition, the engagement provides the thermal conduction path between the strip of thermally conductive material 280 (FIG. 7) and the lid 214. In particular embodiments, the top portion 282 of the circuit boards 206 may engage against or become in contact with the inner surface 222 of the lid 214 during rotation of the carrier shaft 102.

Figure 9:
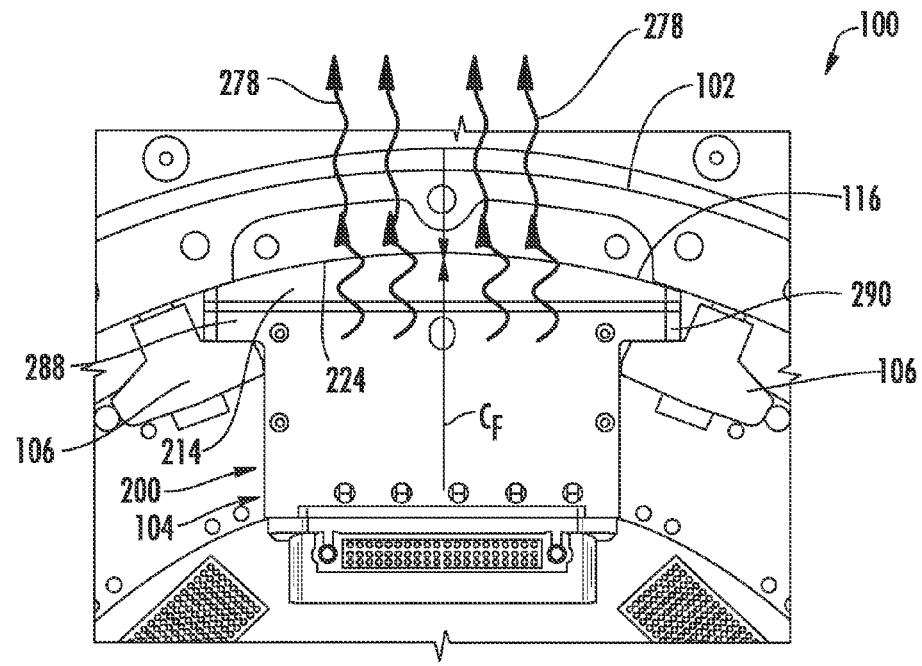
FIG. 9 is an aft view of the system as shown in FIG. 2 partially assembled, according to various embodiments of the present invention.

FIG. 9 provides an aft view of a portion of the system 100 including one transmitter assembly 104, 200 of the plurality of transmitter assemblies 104 inserted into the carrier shaft 102 according to one or more embodiments of the present invention. During assembly of the system 100, the transmitter assemblies 104, 200 may be inserted between two adjacent rail members 106 of the plurality of rail members 106. The adjacent rail members 106 are circumferentially spaced apart along the inner surface 116 of the carrier shaft 102. Each of the rail members 106 may be fixedly connected to and/or against an inner surface 116 of the carrier shaft 102. In particular embodiments, the transmitter housing 202 and/or the lid 214 may form guide or support rails 288, 290 that engage with the adjacent rail members 106. In various embodiments, the rail members 106 and/or the support rails 288, 290 radially support the transmitter assembly 104, 200 within the carrier shaft 102. The support rails 288, 290 may define a thermal conduction path between the transmitter housing 202 and the carrier shaft 102 via the rail members 106.

Figure 10:
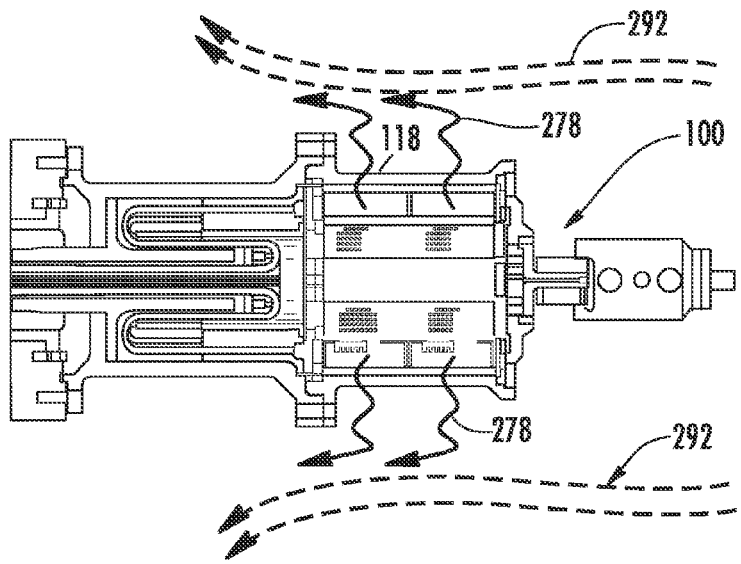
FIG. 10 provides a cross sectional side view of the system for dissipating thermal energy away from electronic components mounted within a rotatable shaft, according to one embodiment of the present invention.

During rotation of the carrier shaft 102, centrifugal forces $C_F$ load each transmitter housing 202, particularly the outer surface 224 of each lid 214, against the inner surface 116 of the carrier shaft 102. Current flowing through the various electronic components 276 (FIG. 6) generates thermal energy 278 that is transferred by thermal conduction via the strip of thermally conductive material 280 and/or the contact members 284 to the inner or contact surface 222 of the lid 214. The thermal energy 278 is then transferred from the outer surface 224 of the lid 214 to the carrier shaft 102 via the inner surface 116. The thermal energy 278 may then radiate from the outer surface 118 of the carrier shaft 102, thus dissipating the heat or thermal energy away from the electronic component 276 or components 276 coupled to the circuit board 206 or circuit boards 206 disposed within the inner pocket 208 or inner pockets 240, 242 of the transmitter housing 202. In particular embodiments, as shown in FIG. 10, the radiating thermal energy 278 may be carried away from the carrier shaft 102 via convective cooling, thus further enhancing overall cooling effectiveness of the system 100. For example, in one embodiment, a coolant 292 such as air may be directed across the outer surface 118 of the carrier shaft 102.

Figure 11:
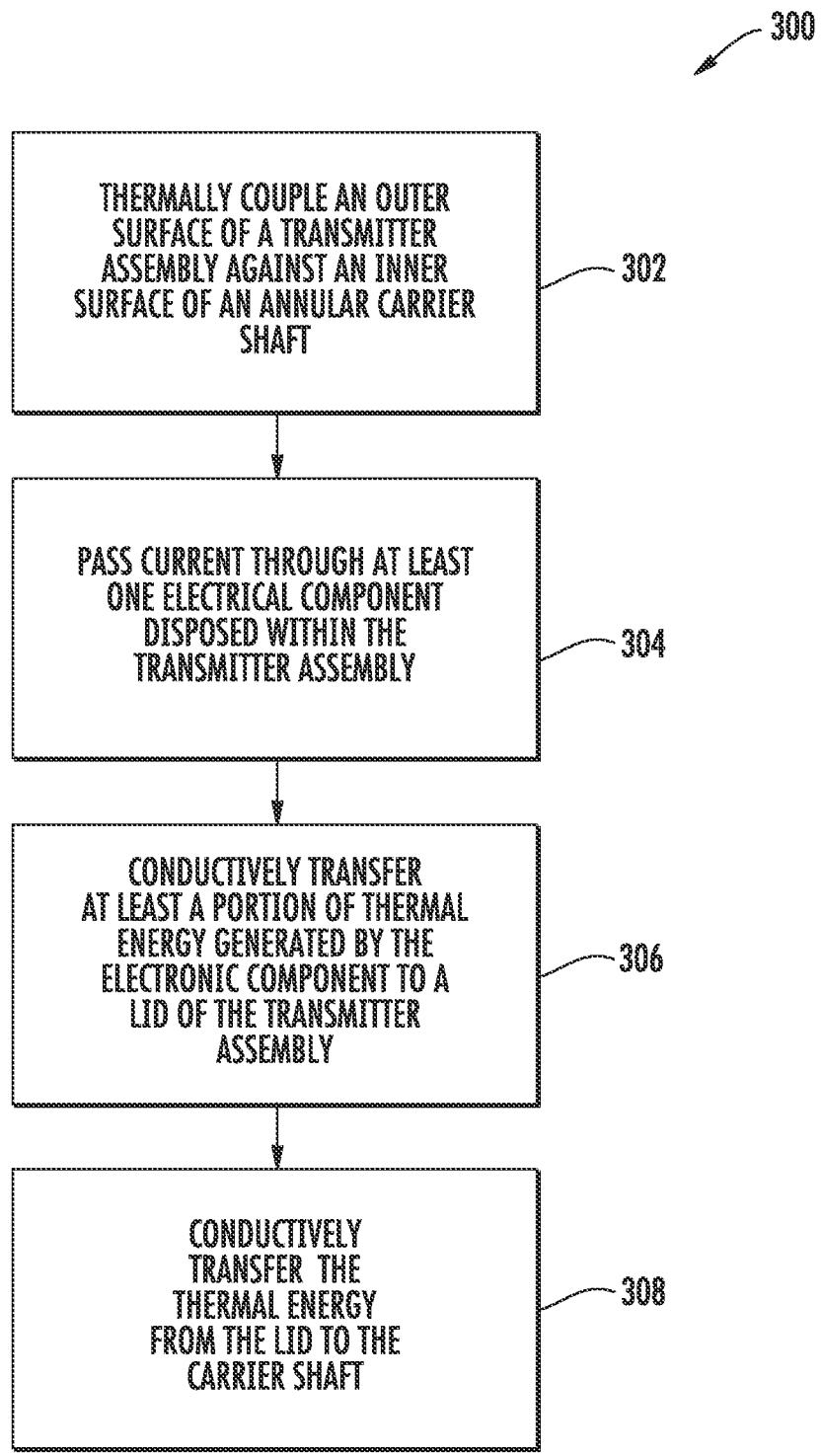
FIG. 11 provides a block diagram illustrating various steps of an exemplary method for dissipating thermal energy from electronic components disposed within a rotatable carrier shaft according to one embodiment of the present invention.

The system 100 as described and illustrated herein, provides a method 300 for dissipating the thermal energy 278 from the electronic component 276 or components 276 disposed within the rotatable carrier shaft 102. FIG. 11 provides a block diagram illustrating the various steps of method 300 according to one embodiment of the present invention. At 302, method 300 includes thermally coupling the outer surface 224 of the lid 214 of at least one of the transmitter assemblies 104, 200 against the inner surface 116 of the annular carrier shaft 102 via centrifugal forces $C_F$ by rotating the carrier shaft 102 where the lid 214 is connected to the top portion 220 of the transmitter housing 202 such that the lid 214 at least partially seals the inner pocket 208. At 304, method 300 includes passing current through at least one electrical component 276 disposed on a circuit board 206 that is mounted within the inner pocket 208, 238, 240 where the electrical component 276 generates thermal energy 278 as the current flows therethrough. At 306, method 300 includes conductively transferring at least a portion of the thermal energy 278 from the circuit board 206 to the lid 214 via the contact surface 222 of the lid 214. At 308, method 300 includes conductively transferring the thermal energy 278 from the lid 214 to the carrier shaft 102.

In particular embodiments, at least a portion of the thermal energy 278 is conductively transferred from the electronic component 276 and/or circuit board 206 to the contact surface 222 of the lid 214 via at least one of the contact member 284 and the thermally conductive shim 212 that is disposed between the top portion 282 of the circuit board 206 and the contact surface 222 of the lid 214. In other embodiments, method 300 may include directing the coolant 292 across the outer surface 118 of the carrier shaft 102, thus convectively cooling the carrier shaft 102.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for dissipating thermal energy away from electronic components disposed within a rotatable shaft, comprising:
   an annular carrier shaft having an inner surface radially spaced from an outer surface and one end formed to couple to an end of a rotor shaft; and
   a transmitter assembly radially supported within the carrier shaft, the transmitter assembly comprising:
      a transmitter housing defining an inner pocket therein;
      a daughter board that extends laterally and longitudinally across a bottom portion of the transmitter housing;
      a circuit board electronically coupled to the daughter board, the circuit board extending substantially perpendicular to the daughter board within the inner pocket, wherein the circuit board comprises a strip of thermally conductive material disposed along a top portion of the circuit board; and
      a lid connected to a top portion of the transmitter housing at least partially sealing the inner pocket, wherein a contact surface of the lid is in thermal communication with the thermally conductive material of the circuit board, wherein at least a portion of a top surface of the lid is in thermal communication with the inner surface of the carrier shaft during rotation thereof.

2. The system as in claim 1, further comprising a thermally conductive shim disposed between the top portion of the circuit board and the contact surface of the lid, wherein the shim defines a thermal conduction path between the strip of thermally conductive material and the contact surface of the lid.

3. The system as in claim 1, further comprising a contact member coupled to the top portion of the circuit board, wherein the contact member defines a thermal conduction path between the strip of thermally conductive material and the contact surface of the lid.

4. The system as in claim 1, wherein the top surface of the lid is arcuate.

5. The system as in claim 1, wherein the top surface of the lid and the inner surface of the carrier shaft have substantially the same profile.

6. The system as in claim 1, wherein the circuit board comprises a plurality of electronic components connected to the circuit board proximate to the top portion and thermally coupled to the strip of thermally conductive material.

7. The system as in claim 1, further comprising a partitioning plate, wherein the top portion of the circuit board extends at least partially therethrough.

8. The system as in claim 1, wherein the transmitter housing includes a vertically oriented slot disposed within the inner pocket.

9. The system as in claim 8, wherein the circuit board is seated within the vertically oriented slot.

10. A turbomachine, comprising:
    an annular rotor shaft;
    a plurality of sensor wire bundles extending outwardly from an inner passage of the rotor shaft;
    an annular carrier shaft formed to couple at a first end to an end portion of the rotor shaft, the carrier shaft having a second end axially spaced from the first end and an inner surface radially spaced from an outer surface;
    a plurality of transmitter assemblies annularly arranged and circumferentially spaced within the carrier shaft, each transmitter assembly comprising:

a transmitter housing defining an inner pocket therein;

a daughter board that extends laterally and longitudinally across a bottom portion of the transmitter housing, wherein the daughter board is electronically coupled at one end to one wire bundle of the plurality of wire bundles;

a circuit board electronically coupled to the daughter board, the circuit board extending substantially perpendicular to the daughter board within the inner pocket, wherein the circuit board comprises a strip of thermally conductive material disposed along a top portion of the circuit board; and a lid connected to a top portion of the transmitter housing at least partially sealing the inner pocket, wherein a contact surface of the lid is in thermal communication with the strip of thermally conductive material of the circuit board, wherein at least a portion of a top surface of the lid is in thermal communication with the inner surface of the carrier shaft during rotation thereof.

11. The turbomachine as in claim 10, further comprising a thermally conductive shim disposed between the top portion of the circuit board and the contact surface of the lid, wherein the shim defines a thermal conduction path between the strip of thermally conductive material and the contact surface.

12. The turbomachine as in claim 10, further comprising a contact member coupled to the top portion of the circuit board, wherein the contact member defines a thermal conduction path between the strip of thermally conductive material and the contact surface of the lid.

13. The turbomachine as in claim 10, wherein the top surface of the lid and the inner surface of the carrier shaft have substantially the same profile.

14. The turbomachine as in claim 10, wherein the circuit board comprises a plurality of integrated circuit components connected to the circuit board proximate to the top portion and thermally coupled to the strip of thermally conductive material.

15. The turbomachine as in claim 10, further comprising a partitioning plate, wherein the top portion of the circuit board extends at least partially therethrough.

16. The turbomachine as in claim 10, wherein the transmitter housing includes a vertically oriented slot disposed within the inner pocket.

17. The turbomachine as in claim 16, wherein the circuit board is seated within the vertically oriented slot.

18. A method for dissipating thermal energy from electronic components disposed within a rotatable shaft, comprising:

thermally coupling an outer surface of a lid of a transmitter assembly against an inner surface of an annular carrier shaft via centrifugal forces by rotating the carrier shaft, wherein the lid is connected to a top portion of a transmitter housing of the transmitter assembly and at least partially seals an inner pocket formed within the transmitter housing;

passing a current through at least one electrical component disposed on a circuit board mounted within the inner pocket, wherein the component generates thermal energy as the current flows therethrough, and wherein the circuit board comprises a strip of thermally conductive material disposed along a top portion of the circuit board and that is thermally coupled to the electronic component;

conductively transferring at least a portion of the thermal energy generated by the electronic component from the circuit board to the lid via a contact surface of the lid; and conductively transferring the thermal energy from the lid to the carrier shaft.

19. The method as in claim 18, wherein at least a portion of the thermal energy is conductively transferred from the circuit board to the contact surface of the lid via at least one of a contact member that is thermally coupled to the strip of the thermally conductive material and a thermally conductive shim that is disposed between the top portion of the circuit board and the contact surface of the lid.

20. The method as in claim 18, further comprising directing a coolant across an outer surface of the carrier shaft.

* * * * *